United States Patent
Bechtel et al.

(10) Patent No.: US 7,393,014 B2
(45) Date of Patent: Jul. 1, 2008

(54) ENERGY ABSORBING SUPPORT FOR A VEHICLE STEERING ASSEMBLY

(75) Inventors: Travis D Bechtel, Goodrich, MI (US); Sean A Bannon, Bloomfield Hills, MI (US); William A Jolley, West Bloomfield, MI (US); William J Elliot, Commerce, MI (US); Richard T Stuedemann, Ortonville, MI (US)

(73) Assignee: Chrysler LLC, Auburn Hills, MI (US)

( * ) Notice: Subject to any disclaimer, the term of this patent is extended or adjusted under 35 U.S.C. 154(b) by 547 days.

(21) Appl. No.: 11/180,258

(22) Filed: Jul. 13, 2005

(65) Prior Publication Data

US 2007/0013182 A1    Jan. 18, 2007

(51) Int. Cl.
*B62D 1/00* (2006.01)
(52) U.S. Cl. ............ 280/777; 280/779; 74/492
(58) Field of Classification Search ................ 280/775, 280/776, 777, 779; 74/492
See application file for complete search history.

(56) References Cited

U.S. PATENT DOCUMENTS

| | | | |
|---|---|---|---|
| 4,901,592 A * | 2/1990 | Ito et al. ................ | 74/492 |
| 4,943,028 A * | 7/1990 | Hoffmann et al. ........ | 248/548 |
| 5,286,056 A * | 2/1994 | Speich ..................... | 280/777 |
| 5,356,179 A * | 10/1994 | Hildebrandt et al. ...... | 280/777 |
| 6,863,306 B2 * | 3/2005 | Bechtel et al. ............ | 280/775 |
| 7,178,833 B2 * | 2/2007 | Cymbal et al. ............ | 280/777 |
| 7,264,274 B2 * | 9/2007 | Ridgway et al. .......... | 280/777 |
| 7,328,631 B2 * | 2/2008 | Murakami et al. ......... | 74/493 |
| 2003/0075912 A1 * | 4/2003 | Riefe et al. ............... | 280/777 |
| 2005/0012361 A1 * | 1/2005 | Weiner et al. .......... | 296/190.11 |
| 2005/0167964 A1 * | 8/2005 | Jurik et al. ................ | 280/777 |
| 2007/0013180 A1 * | 1/2007 | Stuedemann et al. ...... | 280/775 |
| 2007/0013183 A1 * | 1/2007 | Jensen et al. ............. | 280/777 |
| 2008/0012281 A1 * | 1/2008 | Cho et al. ................. | 280/777 |

* cited by examiner

Primary Examiner—Toan C To
(74) Attorney, Agent, or Firm—Ralph E. Smith

(57) ABSTRACT

A vehicle steering assembly includes a mounting plate having a slot and a raised contact surface adjacent to at least part of the slot and a bracket coupled to the mounting plate, adapted to support at least a portion of a steering column. A coupler extends through the slot, and has a head overlying at least a portion of the contact surface, and engages with the bracket to retain the position of the steering column mount relative to the bracket. The combined thickness of all members between the head and the connecting portion is greater when the head overlies the contact surface than when the head is not overlying the contact surface. A greater clamping force is applied by the coupler to all members between the head and the connecting portion when the head overlies the contact surface than when the head is not overlying the contact surface.

12 Claims, 3 Drawing Sheets

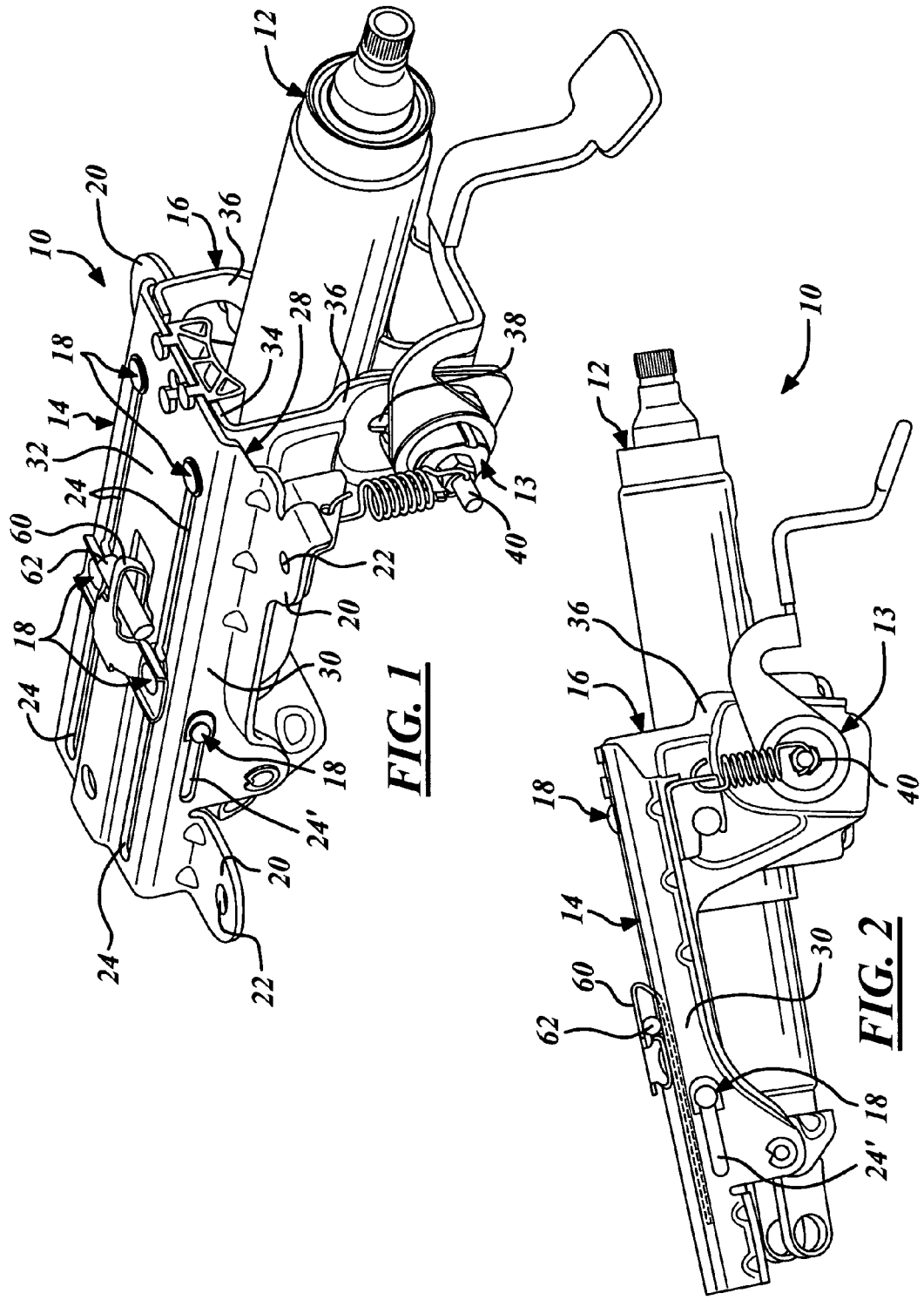

ENERGY ABSORBING SUPPORT FOR A VEHICLE STEERING ASSEMBLY

FIELD OF THE INVENTION

The present invention relates generally to vehicle steering assemblies, and more particularly to an energy absorbing support for a vehicle steering assembly.

BACKGROUND OF THE INVENTION

A steering column of a vehicle typically is secured to the frame of the automobile to ensure safe operation of the automobile. Generally, this is accomplished by bolting the steering column to the instrument panel which may be further secured to the frame of the automobile. However, it can be desirable to allow the steering column to disengage from or move relative to the instrument panel, such as by permitting the steering column to collapse or be displaced, upon the application of a force during an accident.

To permit movement of the steering column under sufficient force, polymer capsules have been proposed to support a mounting bracket of the steering column and are designed in such a way as to break-away under a given force. Thus, the steering column is allowed to axially collapse or move upon the application of a sufficient force in the event of an accident.

Other mechanisms to permit movement or collapse of the steering column have been formed out of stamped metal components suitably welded, or otherwise connected together, to form a deformable support system for the steering column and steering wheel. One problem with such metal mechanisms is that the stamped components can deflect, or deform, under normal operating loads. The mechanisms may also be somewhat complex and require a plurality of steps to manufacture and assemble them.

SUMMARY OF THE INVENTION

A vehicle steering assembly includes a mounting plate having a slot and a raised contact surface adjacent to at least part of the slot and a bracket coupled to the mounting plate, adapted to support at least a portion of a steering column, and having at least one opening aligned with the slot in the mounting plate. A coupler extends through the slot and the opening, and has a head overlying at least a portion of the contact surface, and a connecting portion overlying a portion of the bracket to retain the position of the steering column mount relative to the bracket. The combined thickness of all members between the head and the connecting portion is greater when the head overlies the contact surface than when the head is not overlying the contact surface. A first clamping force is applied by the coupler to all members between the head and the connecting portion when the head overlies the contact surface and a lesser clamping force is applied by the coupler to all members between the head and the connecting portion when the head is not overlying the contact surface.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 1 is a perspective view of one embodiment of a steering assembly showing a steering column in its extended position;

FIG. 2 is a side view of the steering assembly of FIG. 1;

DETAILED DESCRIPTION OF PREFERRED EMBODIMENTS

Figure 3:
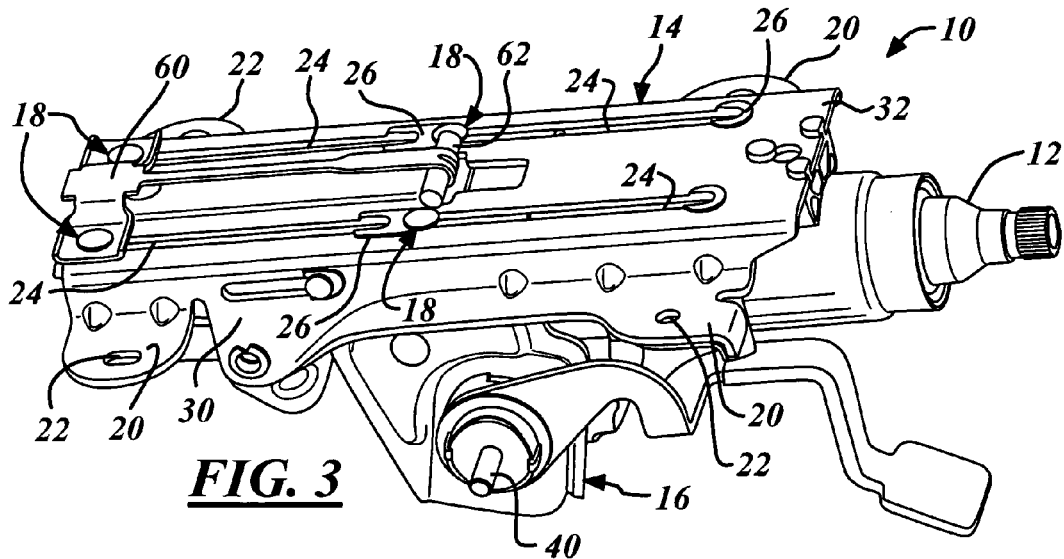
FIG. 3 is a perspective view of the steering assembly shown in a collapsed position.

Referring in more detail to the drawings, FIGS. 1 through 3 illustrate a vehicle steering assembly 10 having an energy absorbing support that permits movement of at least a portion of the steering assembly 10 when sufficient force is applied thereto. The steering assembly 10 includes a steering wheel (not shown) connected to a steering column 12 that is carried by the vehicle preferably by a tilt mechanism 13. The support system includes a mounting plate 14 secured to the vehicle, preferably beneath an instrument panel on the driver side of the vehicle, and a bracket 16 moveably coupled to the mounting plate 14 and adapted to support a portion of the steering column 12. One or more couplers 18 secure the bracket 16 to the mounting plate 14 and permit movement of the bracket 16 relative to the mounting plate 14 when a sufficiently high force is applied to the steering column 12, as will be discussed in more detail below.

The mounting plate 14 preferably includes one or more outwardly extending flanges 20 each having one or more openings 22 through which suitable fasteners may be used to attach the mounting plate 14 to a portion of the vehicle, such as an instrument panel of the vehicle. The mounting plate 14 also includes one or more elongated slots 24 that extend generally parallel to the axis of the steering column 12 in assembly. Desirably, at least two parallel and spaced apart slots 24 are provided in the mounting plate 14, and in one presently preferred implementation, four slots 24 are provided with two parallel slots in an upper or rearward portion of the mounting plate 14 and two parallel slots in a lower or forward portion of the mounting plate 14 that are preferably aligned with the slots in the upper portion of the mounting plate 14. Adjacent a portion of each slot 24, a raised contact surface 26 is provided so that the mounting plate 14 has an increased thickness in the area of the contact surface 26 adjacent to the slots 24. In one presently preferred embodiment, the contact surface 26 is raised from the adjacent area of the slot by about 0.5 mm to 1.5 mm, more preferably about 0.9 mm, although other dimensions may be used. Desirably, the contact surface 26 adjacent each slot 24 is formed at one end of the slot, such as the rearward ends, and may extend partially around an end of the slot, as best shown in FIG. 3. Except for the area of the contact surface 26, the thickness of the mounting plate 14 surrounding the periphery of the slots 24 preferably is generally uniform and less than that in the area of the contact surfaces 26. The mounting plate 14 may include a channel 28 defined by sidewalls 30 on opposed sides of central portion 32 in which the slots 24 are formed. One or both sidewalls 30 may include one or more slots 24' extending parallel to the slots 24 in the central portion 32.

The bracket 16 may be received generally within the channel 28 of the mounting plate 14 and preferably includes a central portion 34 disposed adjacent to the central portion 32 of the mounting plate 14, and transverse flanges 36 extending away from the mounting plate 14 and including slots 38 (FIG.

Figure 4:
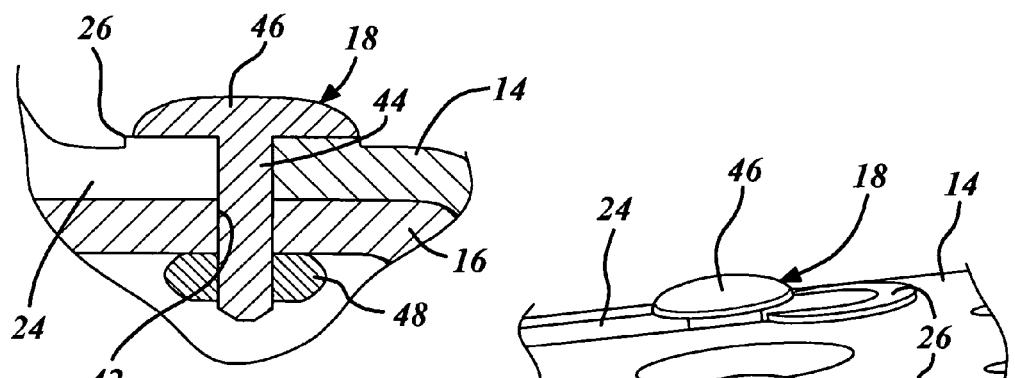
FIG. 4 is a fragmentary side view showing one embodiment of a coupler of the steering assembly.
Figure 5:
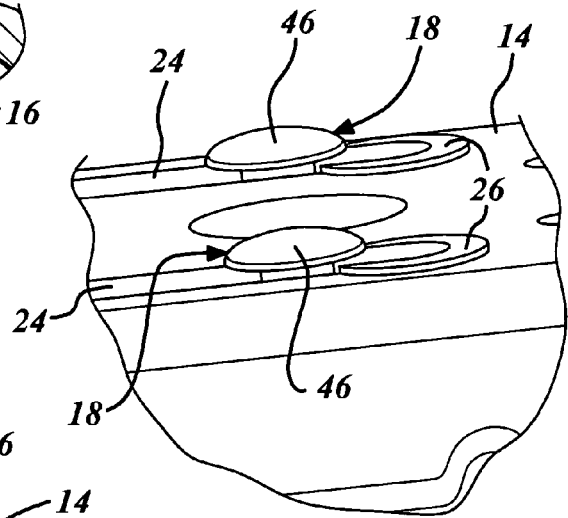
FIG. 5 is an enlarged fragmentary perspective view of a portion of the steering assembly.
Figure 7:
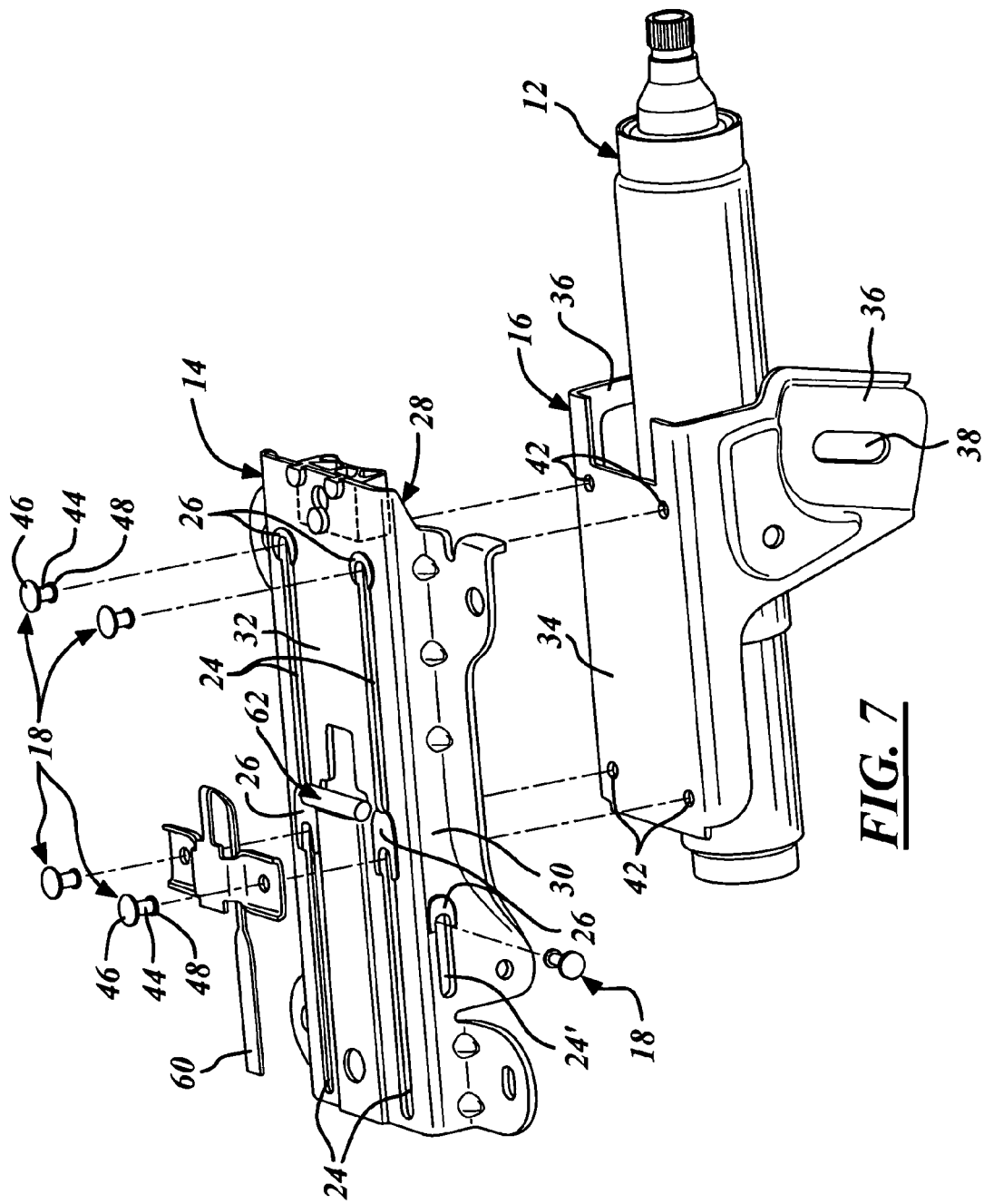
FIG. 7 is an exploded perspective view of some of the components of the steering assembly of FIG. 1.

1) through which a rod or fasteners 40 may extend to facilitate coupling the steering column 12 to the bracket 16 in conventional manner. As best shown in FIGS. 4 and 7, at least one opening 42 is formed in the bracket 16, and preferably, at least one opening 42 is formed for each of the slots 24, 24' of the mounting plate 14. In assembly, the openings 42 are aligned with respective slots 24, 24' in the mounting plate 14 so that a fastener or coupler 18 can be inserted through each of the slots 24, 24' and a corresponding opening 42 in the bracket 16.

Figure 6:
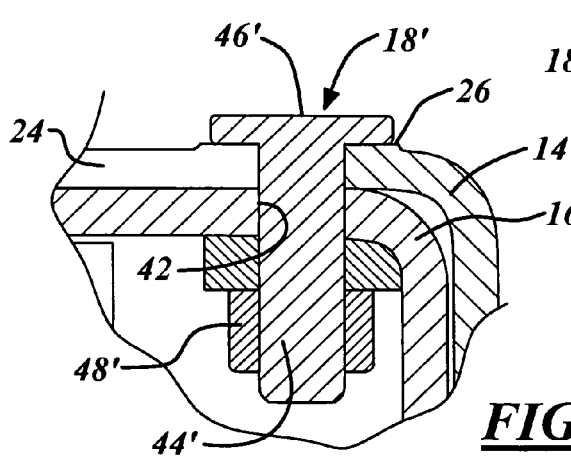
FIG. 6 is a fragmentary side view showing an alternate embodiment coupler.

Each fastener or coupler 18 preferably includes a shank 44 that extends through its associated slot 24, 24' and opening 42, an enlarged head 46 that overlies a portion of the mounting plate 14, and a connecting portion 48 that overlies a portion of the bracket 16 to couple the bracket 16 to the mounting plate 14. The shank 44 preferably is relatively closely received in the opening 42 so that the coupler moves with the bracket 16. The coupler 18 may be a rivet wherein the connecting portion 48 is a deformed end of the rivet that is crimped or otherwise engaged with the bracket 16, or a nut and bolt wherein the connecting portion 48 is a nut secured on the bolt and engaging the bracket either directly or through a spacer, washer or the like. Similar spacers, washers or the like may be disposed between the head 46 and the mounting plate 14, if desired. Suitable fasteners or couplers 18 are commercially available from Alcoa under the trade name Huck Lock, such as a Huck Lock double locking blind rivet. A coupler 18' may be a two-piece assembly where the connecting portion 48' is separate from the head 46' and shank 44' and requiring access to both of its ends, as generally shown in FIG. 6, or maybe a blind-type rivet or fastener requiring access to only one end (or generally shown in FIG. 4) to install and secure the coupler 18 in place.

When initially assembled, and throughout normal use of the steering assembly 10, the head 46 of each coupler 18 overlies and preferably engages the contact surface 26 of the mounting plate 14 and the couplers 18 are installed to provide a clamping force suitable to retain the position of the steering column 12 throughout normal use and driving conditions of the vehicle. When a force is applied to the steering column 12, with at least a sufficiently high component of that force acting generally along an axis of the steering column 12, the bracket 16 is displaced relative to the mounting plate 14 and the couplers 18 are slidably moved within the slots 24. Once the heads 46 of the couplers 18 clear or slide past the contact surfaces 26, the clamping force holding the bracket 16 to the mounting plate 14 is reduced or relieved entirely since the thickness of all components clamped between the head 46 and connecting portion 48 of the couplers 18 is less when the couplers 18 are not in contact with the contact surface 26. Accordingly, the stroke or collapsing of the steering column 12 is impeded less by the couplers 18 when the couplers 18 clear the contact surfaces 26.

Some of the energy of the collapsing steering column 12 initially is absorbed by way of initially displacing the couplers 18 from the contact surfaces 26. The force required to displace the couplers 18 from the contact surfaces 26 is a function of the surface areas of the engagement between the head 46 and contact surface 26, and the connecting portion 48 and the bracket 16, the static friction that must be overcome to initially move the couplers 18, and the dynamic or sliding friction that must be overcome to continue movement of the couplers 18. The force decreases as the surface area of engagement between the head 46 and contact surface 26 decreases, and as the axis of the coupler 18 moves away from the contact surface 26, until the head 46 fully clears the contact surface 26. The couplers 18 may initially be installed with a clamping force of between about 300 lbs to 600 lbs per rivet. In one presently preferred implementation utilizing five rivets, the system is designed to permit release and collapsing of the steering column 12 under a load of as low as 1500 newtons. Of course, based on the clamping force, friction, number of rivets, and other factors, the load or force required to initiate release of the steering column 12 can be adjusted as desired for a particular application.

Accordingly, since in the preferred implementation, the thickness of all the components between the head 46 and connecting portion 48 of the coupler 18 is greatest in the area of the contact surface 26 than when the head 46 is spaced therefrom, a greater clamping force is provided by the couplers 18 to the mounting plate 14 and bracket 16 when the heads 46 of the couplers 18 are engaged with the contact surfaces 26. A lesser clamping force, which may be essentially zero, may be applied by the couplers 18 to the bracket 16 and mounting plate 14 when the heads 46 of the couplers 18 are not engaged with the contact surfaces 26.

Of course, other energy absorbing devices may be used in conjunction with the fasteners and contact surfaces, as desired. For example, a somewhat rigid but flexible bend strap 60 may be coupled to the bracket 16 and disposed around a pin 62 carried by the mounting plate 14 so that movement of the bracket 16 relative to the mounting plate 14 pulls and bends the strap 60 about the pin 62 to further absorb or dissipate energy in the collapsing steering assembly 10. Certain bend strap configurations are known in the art and may be employed if desired.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the contact surfaces 26 are shown as being generally planar, they may be sloped or ramped, or otherwise configured to control the clamping force provided by the couplers 18 over a desired range of movement of the bracket 16 to control the release and collapsing of the steering column 12 as desired. Of course, still other modifications and substitutions can be made. The invention is defined by the following claims.

What is claimed is:

1. A vehicle steering assembly, comprising:
   a steering column;
   a mounting plate adapted to be carried by the vehicle and having a slot and a raised contact surface adjacent to at least part of the slot;
   a bracket coupled to the mounting plate, operably coupled to at least a portion of the steering column, and having at least one opening aligned with the slot in the mounting plate; and
   a coupler extending through the slot and the opening, and having a head overlying at least a portion of the contact surface, and a connecting portion overlying a portion of the bracket to releasably retain the position of the bracket relative to the mounting plate wherein the combined thickness of all members between the head and the connecting portion is greater when the head overlies the contact surface than when the head is not overlying the contact surface so that a greater clamping force is applied by the coupler to all members between the head and the connecting portion when the head overlies the contact surface than when the head is not overlying the contact surface.

2. The assembly of claim 1 wherein the coupler is a rivet and the connecting portion is a deformed portion of the rivet.

3. The assembly of claim 1 wherein the connecting portion is a separate piece from the head and is secured to a portion of the coupler that is integral with the head.

4. The assembly of claim 1 wherein in the area of the slot the mounting plate is 0.5 mm to 1.5 mm thicker in the region of the contact surface.

5. The assembly of claim 2 wherein the contact surface is generally planar.

6. The assembly of claim 1 wherein the coupler is installed with a clamping force on the mounting plate and bracket of between 300 lbs to 600 lbs.

7. The assembly of claim 1 wherein the coupler is a blind-type rivet.

8. The assembly of claim 1 wherein the coupler is a two-piece fastener.

9. The assembly of claim 1 which also comprises another slot in the mounting plate that is disposed parallel to said slot, and another coupler disposed in said another slot.

10. The assembly of claim 1 wherein the coupler includes a shank that is closely received in the opening of the bracket so that the coupler moves with the bracket.

11. The assembly of claim 1 wherein the coupler moves freely within the slot when the head is spaced from the contact surface.

12. The assembly of claim 1 wherein the slot extends parallel to an axis of the steering column.

* * * * *